United States Patent [19]

Paffrath

[11] 4,398,858

[45] Aug. 16, 1983

[54] APPARATUS FOR LOADING AND UNLOADING A SECONDARY VEHICLE INTO AND FROM AN AUTOMOBILE

[75] Inventor: Edgar C. Paffrath, Birch Run, Mich.

[73] Assignee: Amigo Sales, Inc., Bridgeport, Mich.

[21] Appl. No.: 202,642

[22] Filed: Oct. 31, 1980

[51] Int. Cl.³ .............................................. B60P 1/54
[52] U.S. Cl. .................................... 414/462; 414/542; 414/921
[58] Field of Search ................ 414/462, 541, 542, 921

[56] References Cited

U.S. PATENT DOCUMENTS

| | | | |
|---|---|---|---|
| 3,656,637 | 4/1972 | Lynn et al. | 414/462 X |
| 3,910,432 | 10/1975 | Browne et al. | 414/921 X |
| 3,957,164 | 5/1976 | Brown | 414/921 X |
| 4,245,947 | 1/1981 | Clement | 414/462 |
| 4,281,958 | 8/1981 | Molski | 414/921 X |

FOREIGN PATENT DOCUMENTS

| | | | |
|---|---|---|---|
| 1383457 | 2/1975 | United Kingdom | 414/921 |
| 1427838 | 3/1976 | United Kingdom | 414/921 |

*Primary Examiner*—Leslie J. Paperner
*Attorney, Agent, or Firm*—Learman & McCulloch

[57] ABSTRACT

A loading apparatus is operable to load or unload a secondary vehicle usable by a handicapped person to and from the rear passenger compartment of a four-door automobile. The secondary vehicle, a single passenger battery powered three wheel vehicle, is longer than the width of the rear door opening and the loading apparatus automatically swings the secondary vehicle during the process to pass endwise through the rear door opening and to be located parallel to the automobile when grounded at the beginning of the loading operation and at the conclusion of the unloading operation.

26 Claims, 11 Drawing Figures

APPARATUS FOR LOADING AND UNLOADING A SECONDARY VEHICLE INTO AND FROM AN AUTOMOBILE

BACKGROUND OF THE INVENTION

Many handicapped people are physically disabled only to the extent that their ability to walk is impaired to the point that they are unable to move about without physical or mechanical assistance. Such persons have available to them both automobiles fitted with hand operated controls and also other forms of shorter range locomotion, such as power driven wheel chairs or small one passenger power driven carts.

While hand controlled automobiles and power driven chairs or carts respectively provide long range and short range transportation to such handicapped persons, a problem arises when it is attempted to combine these two forms of transportation. The handicapped person frequently is capable of transferring himself from his power driven cart to the driver's seat of his hand controlled automobile and vice versa, but he is totally unable, without assistance, to load or unload his short range cart into and from the automobile.

The present invention is especially directed to the provision of a loading apparatus by means of which a power driven cart can be readily loaded and unloaded into and from the rear compartment of a four-door automobile.

SUMMARY OF THE INVENTION

In accordance with the present invention, a loading apparatus includes a traversing head mounted within a four-door automobile for movement transversely of the automobile across the interior top of the rear passenger compartment. The traversing head is driven in movement by a reversible motor which can be operated by suitable controls accessible to a person seated in the driver's seat of the car. The traversing head carries a lifting head which is pivotal relative to the traversing head about a vertical axis. When the traversing head is adjacent the driver's side rear door opening, the lifting head projects outwardly beyond the side of the car so that a coupling member, which can be raised or lowered by the lifting head, can be attached to a power driven cart parked in side-by-side relationship to the automobile. The coupling member is readily attached by the handicapped person to the cart while sitting in the driver's seat and the lifting head, which again is power driven and operated by hand controls accessible to the driver, lifts the cart upwardly to a position where it will clear the bottom of the rear door opening. The traversing mechanism is then actuated to carry the elevated cart into the rear passenger compartment of the car.

Because the cart, for convenience to the handicapped person in shifting from the cart into the automobile, is normally parked parallel to the automobile, and because the cart is normally longer than the width of the rear door opening, a pivoting mechanism is coupled between the traversing head and the lifting head so that the head is automatically swung through 90° during the initial movement carrying the cart into the automobile. This pivoting movement of the lifting head is reversed during the unloading operation. Thus, as the cart passes through the door opening in either direction, it passes through this opening endwise, but when it is being raised and lowered from and to the parked position beside the automobile, the cart is in a position parallel to the automobile.

Other features and objects of the invention will become apparent by reference to the following specification and to the drawings.

Figure 8:
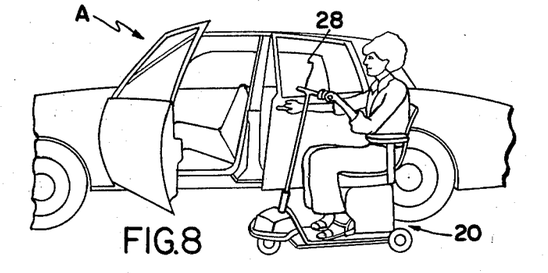
FIGS. 8, 9 and 10 are views illustrating successive steps in the loading operation.
Figure 9:
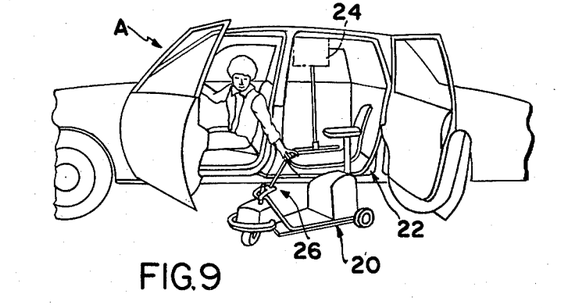
Figure 10:
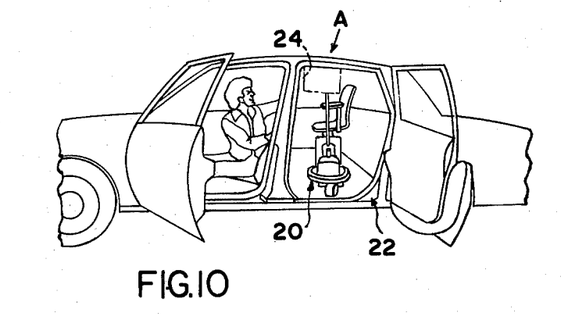

The structural details of the loading apparatus of the present invention may be more easily understood by first reviewing generally its operation by reference to FIGS. 8, 9 and 10. The apparatus is designed, as shown in FIGS. 8 through 10, to load and unload a single passenger battery powered cart designed generally 20 to and from the rear passenger compartment of a four-door automobile A.

The particular cart 20 shown in the drawings is a commercially available cart manufactured and sold by the assignee of the present application under the trademark AMIGO. As shown in the drawings, the cart 20 is a single passenger three-wheeled battery powered cart operated by suitable hand controls, not shown, which may be used for short range trips by persons suffering from an ambulatory disability. Typical users of this cart are handicapped only by some disability involving their legs and are thus capable of getting themselves from the cart to the driver's seat of the automobile. The length of the cart is somewhat greater than the width of the rear door opening of the automobile.

Most present-day automobiles will require some modifications to accommodate usage of the present invention.

In order to make the loading and unloading operation as convenient as possible to the handicapped person, the rear door on the driver's side of the car should be hinged at the rear, as illustrated. Because most present-day cars find the rear doors hinged at the front, this modification is one which is frequently made.

The remaining modifications to the automobile A are dictated by the dimensions of the cart 20. In order to provide adequate space within the rear passenger compartment to receive the cart, the rear seat cushion normally must be removed as shown, and it is sometimes necessary, to accommodate the cart, to enlarge the rear door opening at its lower rear corner as at 22. Normally a flat platform or deck, not shown will be installed to provide a flat floor in the rear compartment to support the cart.

To briefly review in general the operation performed by the loading mechanism of the present invention, as shown in FIGS. 8-10, the handicapped person drives the cart 20 alongside the automobile A and, as shown in FIG. 8, opens the doors while seated in the cart 20. The cart is then parked closely alongside the vehicle and the operator shifts from the cart to the driver's seat of the car. The loading mechanism to be described below is indicated generally at 24 in FIG. 9 and is then operated by the operator to an extended position in which a coupling mechanism designated generally 26 is coupled to the cart. In this particular cart, the handle bars 28 (FIG. 8) are fairly tall and, for convenience in loading, are made to be easily removable so that they can be removed before the cart is loaded into the automobile.

In FIG. 9, the operator has removed the handlebars 28 and attached the coupling mechanism 26 to the cart. The loading mechanism is then actuated, in a manner to be described below, to lift the cart upwardly above the bottom of the rear door opening. The loading mechanism is then actuated to carry the cart 20 into the rear passenger compartment, a portion of the loading mechanism to be described below swinging the cart during the initial transverse motion into an endwise relationship to the automobile so that it can pass freely through the rear door opening into the rear passenger compartment. A rear door closing mechanism, not shown, is then employed to close the rear door. Unloading of the cart 20 from automobile A is accomplished by a reversal of the loading process.

Figure 1:
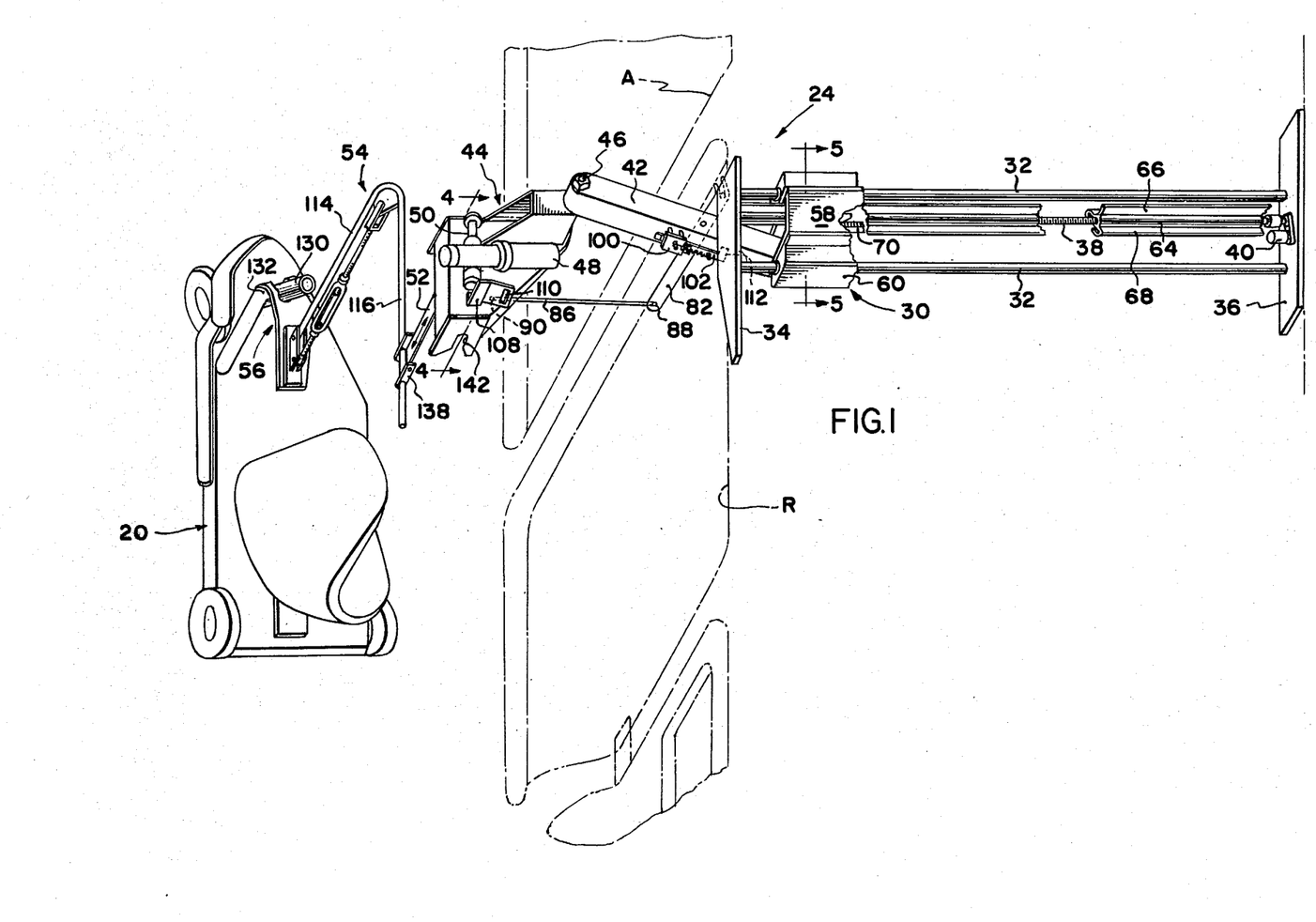
FIG. 1 is a perspective view of a loading mechanism embodying the present invention taken from a point above, to the rear, and to the outside of the mechanism as installed in an automobile, portions of the automobile being indicated in broken line, and other parts of the mechanism being broken away.

The overall details of loading mechanism 24 is best shown in FIG. 1. In FIG. 1, for purposes of clarity, only portions of the automobile A are indicated in broken line, the rear door opening being indicated at R. The major components of loading mechanism 24 include a traversing head designated generally 30 which is supported within the interior of the automobile adjacent the roof of the rear passenger compartment. Head 30 is mounted for movement transversely across the top of the rear passenger compartment upon parallel guide rails 32 fixedly mounted in frame members 34, 36 which in turn are fixedly and permanently secured to the frame of automobile A. A transversely extending lead screw 38 is journaled at its opposite ends for rotation in frame members 34 and 36 and is driven in rotation by a reversible motor 40 operated by suitable controls, not shown, accessible to a person seated in the driver's seat of the automobile.

Traversing head 30 is shown in FIG. 1 in what will be referred to as the loading position, in which head 30 is at that end limit of its travel on rails 32 adjacent the driver's side rear door opening R of the automobile. Traversing head 30 includes a projecting arm 42 fixedly cantilevered from the head so that when traversing head 30 is in the loading position, shown in FIG. 1, arm 42 projects outwardly through rear door opening R beyond the side of the automobile.

A lifting head designated generally 44 is mounted upon the outer end of arm 42 by a pivot 46 which enables lifting head 44 to pivot relative to traversing head 30 about the vertical axis established by pivot 46. A reversible lift motor 48 is mounted upon lifting head 44 to drive a drum 50 in rotation, drum 50 being operable to wind up or unwind a suspension cable in the form of a nylon strap 52.

A coupling mechanism 54, to be described in greater detail below, is suspended from the lower end of suspension strap 52 and carries at its lower end a bracket designated generally 56 employed to couple the coupling mechanism 54 to the secondary vehicle or cart 20.

Like the motor 40 employed to drive traversing screw 38, lift motor 48 is a reversible electrical motor whose operation is controlled by suitable controls, not shown, accessible to a person in the driving seat of the automobile.

Figure 5:
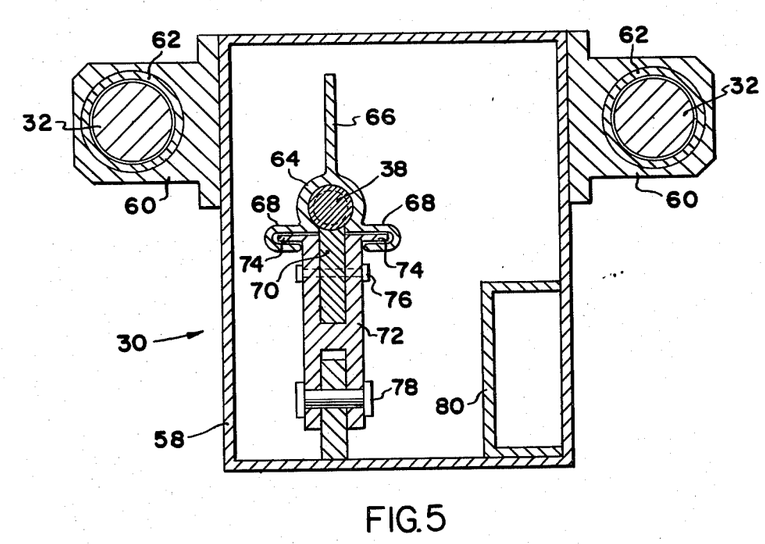
FIG. 5 is a detail cross-sectional view of the traversing head taken on the line 5—5 of FIG. 1.

As best seen in FIG. 5, traversing head 30 includes a housing 58 having a pair of bearing blocks 60 fixedly mounted upon opposite sides of housing 30. Bearing blocks 60 serve to mount linear bearings 62 which receive guide rails 32 to thus support housing 58 for sliding movement along guide rails 32.

Because traversing screw 38 is of substantial length, it is partially enclosed within a partial housing 64 having stiffening flanges 66, 68 as shown in FIG. 5. The threads of screw 38 mesh with a rack 70 carried by a rack housing 72 having horizontal flanges 74 slidably received within the reversely bent stiffening flanges 68 of screw housing 64. Rack 70 is fixedly secured to rack housing 72 as by suitable fasteners 76, and rack housing 72 is in turn fixedly secured to housing 58 as by fasteners 78. The interengagement between flanges 74 of rack housing 72 and flanges 68 of screw housing 64 assure that the screw threads and teeth of rack 70 are maintained in meshed engagement throughout the full range of movement along the substantial length of screw 38. An angle iron 80 is welded in the interior of housing 58 to provide a socket within which arm 42 (see FIG. 1) may be fixedly secured.

Figure 6:
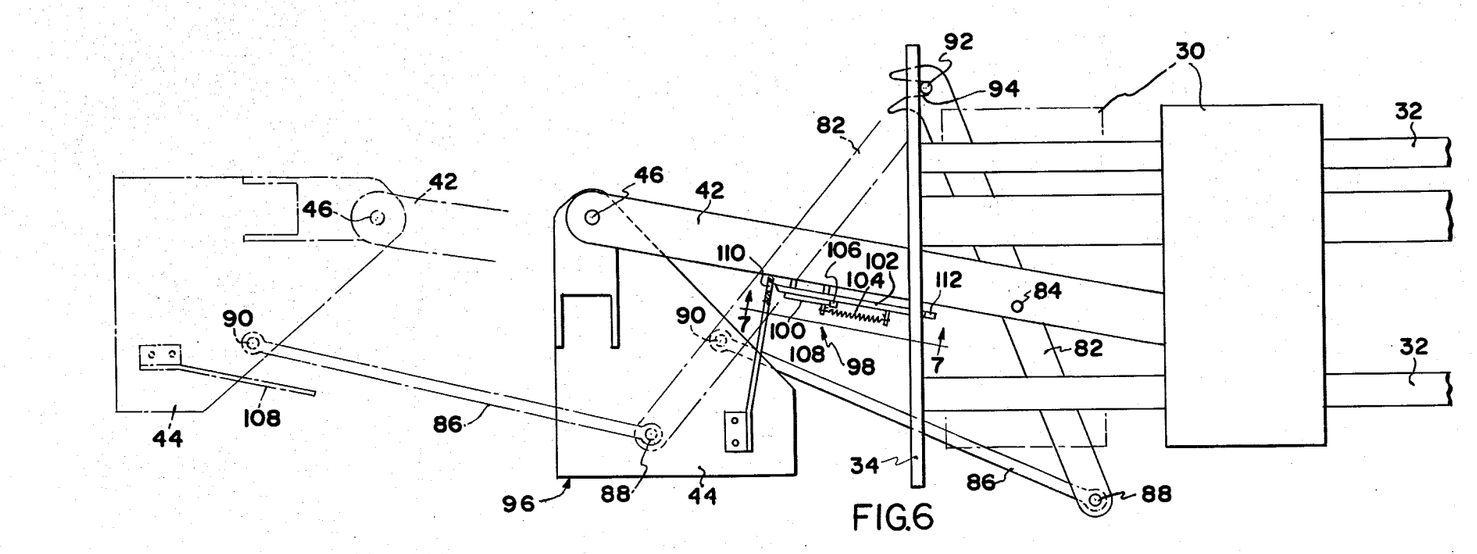
FIG. 6 is a top plan view of a portion of the apparatus of FIG. 1.
Figure 7:
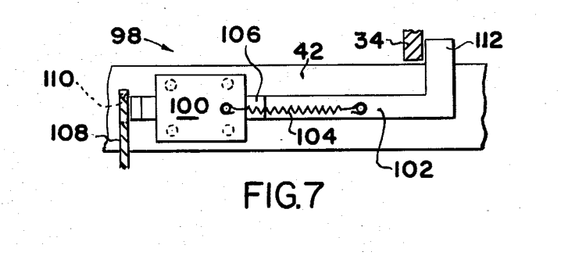
FIG. 7 is a cross-sectional view taken on the line 7—7 of FIG. 6.

Referring now to FIG. 6, it is seen that an actuating lever 82 is pivotally mounted at a location intermediate its ends to the underside of arm 42, as by a pivot pin 84. A rigid link 86 is pivotally connected by a pivot 88 to one end of lever 82 and a second pivot 90 connects the opposite end of link 86 to lifting head 44 at a location spaced from the vertical pivot 46 which mounts lifting head 44 at the distal end of arm 42 of the traversing head. Lever 82 and link 86 are employed, during movement of the traversing head near its loading position, to pivot lifting head 44 between the full line and broken line positions shown in FIG. 6. This pivoting action is automatically accomplished by the engagement of actuating lever 82 with a fixed abutment pin 92 mounted on frame member 34.

Let it be assumed that in FIG. 6, traversing head 30 is moving from right to left as viewed in FIG. 6 and, as illustrated in full line, pin 92 has just engaged the bottom of slot 94 in lever 82. Further movement of traversing head 30 to the left from the full line position shown in FIG. 6 will carry the actuating lever mounting pivot 84 to the left, however, the engagement between the stationary actuating pin 92 and the recessed end of actuating lever 82 will hold this latter end of lever 82 stationary. Thus, leftward movement of traversing head 30, and lever mounting pin 84 from the full line position in FIG. 6, will cause lever 82 to be swung in clockwise pivotal movement about pin 92 toward the broken line position of lever 82 in FIG. 6. This action requires link 86 to move to the left as viewed in FIG. 6, and this action of link 86 will cause lifting head 44 to pivot about pivot 46 in a clockwise direction toward the broken line position of head 44 illustrated in FIG. 6. At the time traversing head 30 arrives at its extreme left-hand limit of movement—that is as it arrives at the loading position, the lever-link combination 82-86 has pivoting lifting head 40 through an angle of 90° about the axis of pivot 46.

Similarly, when traversing head 30 is moved to the right away from its loading position illustrated in broken lines in FIG. 6, this right-hand movement of head 30 draws pivot 84 to the right from its broken line position shown in FIG. 6. Because the forked end of actuating lever 82 is engaged with pin 92, this rightward movement of pivot 84 causes a counterclockwise pivotal movement of lever 82 about pivot 84, thus starting to swing lifting head 44 about pivot 46 back toward the full line position shown in FIG. 6. When lifting head 44 is restored to the full line position shown in FIG. 6, it is latched in this position, by a latch to be described below and further rightward movement of traversing head 30 simply disengages lever 82 from actuating pin 92 and lifting head 44, link 86 and lever 42 remain in this same relationship during further retracting movement of traversing head 30 to the right.

As will be explained in greater detail below, when cart 20 is in the elevated position in which it is carried, by movement of traversing head 30, into or out of rear door opening R, the longitudinal axis or centerline of cart 20 is held stationary relative to lifting head 44 in a relationship such that the longitudinal centerline of the cart is maintained in parallel relationship with the edge 96 (FIG. 6) of lifting head 44. In order to make sure that swaying of the cart does not pivot lifting head 44 relative to arm 42 after actuating lever 82 has been disengaged from actuating pin 94, a latch assembly designated generally 98 is employed. A latch bracket 100 is mounted upon the side of arm 42 to slidably receive and guide a latch member 102. A spring 104 normally biases latch member 102 to an extended position projecting beyond bracket 100, established by the engagement between a stop 106 on latch member 102 and bracket 100. A latch striker 108 is mounted upon lifting head 44 and provided with an opening 110 into which latch member 102 can project. To assure that the latching action of latch assembly 98 is released when lever 82 is engaged with actuating pin 92, a vertical projection 112 on latch member 102 is located to engage frame member 34 during movement of traversing member 30 toward its loading position at a point in this movement just prior to the movement of lever 82 into engagement with actuating pin 92. Further movement of traversing head 30 toward its loading position finds latch member 102 held stationary by frame 34, thus causing the latch 102 to be retracted from striker 108 just before actuating lever 82 begins to pivot lifting head 44.

Figure 2:
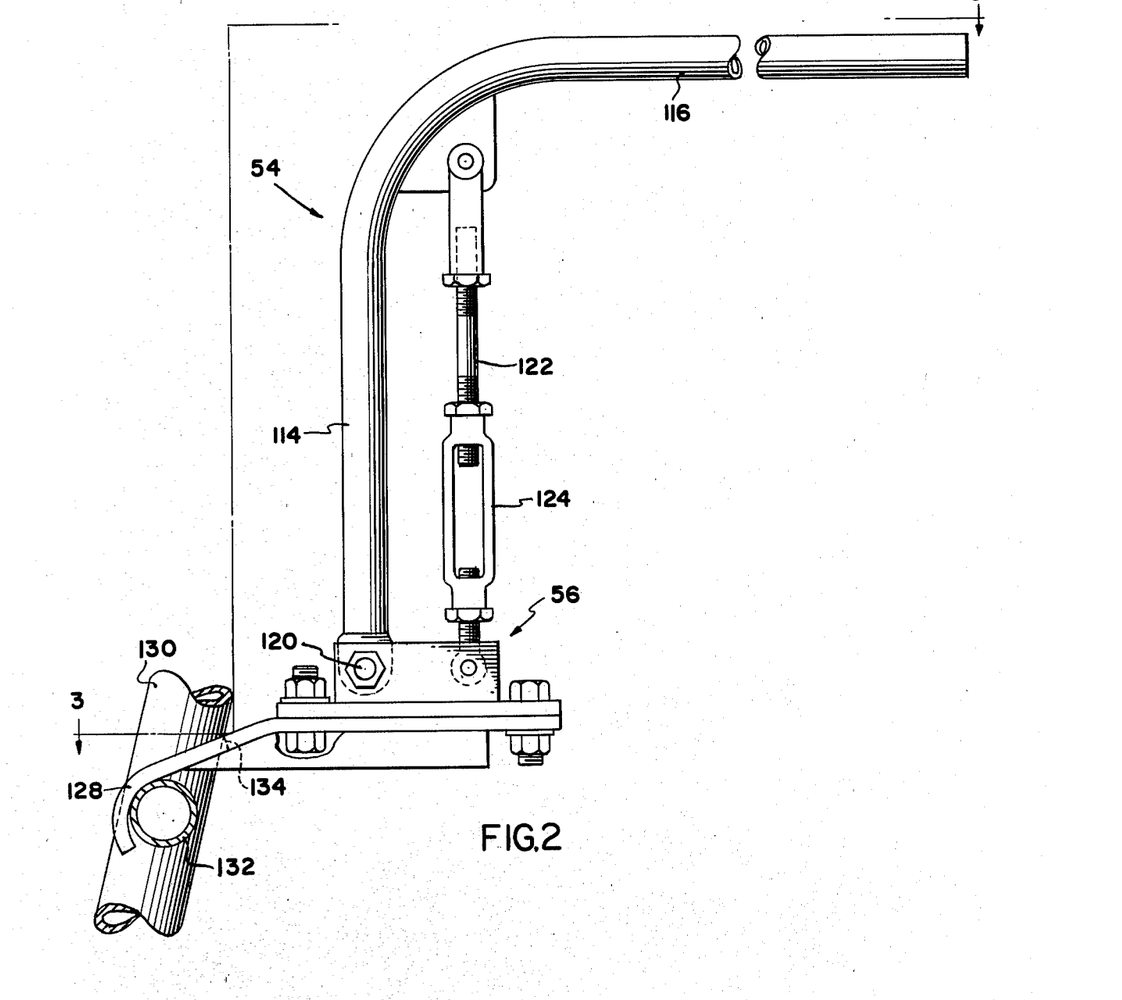
FIG. 2 is a side elevational view of the coupling mechanism of the present invention, with certain parts broken away.
Figure 3:
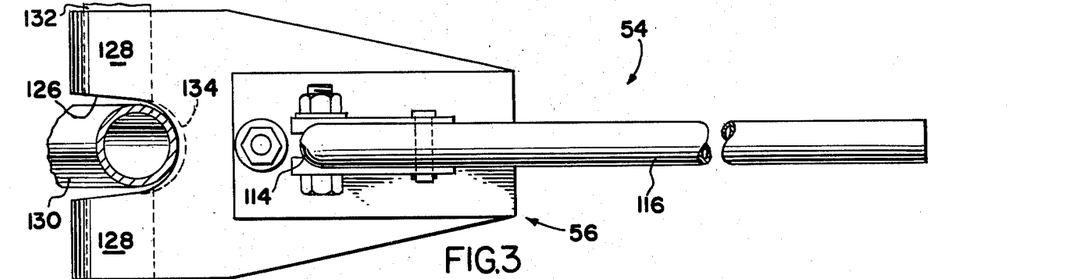
FIG. 3 is a top plan view of the structure shown in FIG. 2, having a partial cross-section taken on line 3—3 of FIG. 2.
Figure 4:
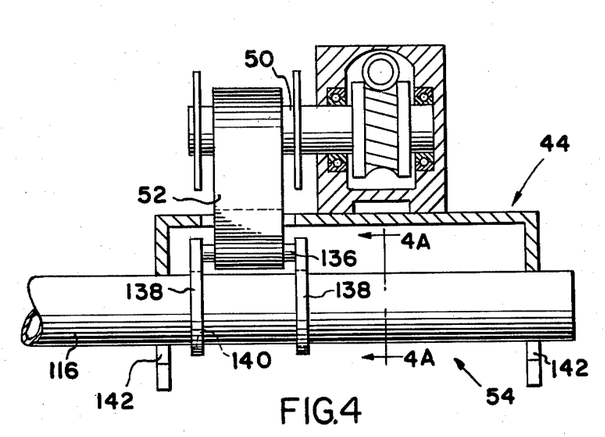
FIG. 4 is a detail cross-sectional view of a portion of the lifting head taken approximately at the line 4—4 of FIG. 1.
Figure 4A:
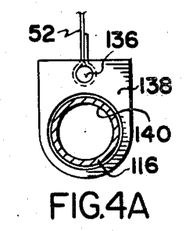
FIG. 4A is a detailed cross-sectional view taken on the line 4A—4A of FIG. 4.

Details of coupling assembly 54 are best seen in FIGS. 2 through 4. Coupling assembly 54 includes a rigid one-piece member of tube or bar stock bent to form a vertical leg portion 114 and a horizontal arm portion 116. A bracket assembly designated 56 is pivotally mounted at the lower end of leg portion 114 by a pivot 120. An extensible link 122, which includes a turnbuckle 124, is pivotally connected between bracket 56 and arm 116 in spaced parallel relationship to leg portion 114. By extending or contracting the length of link 122, bracket 56 can be adjustably positioned about the axis of pivot 120 to enable accurate leveling of cart 20 when it is suspended from the lift.

As best seen in FIG. 3, a recess 126 is formed in the forward end of bracket 56 and a pair of arms 128 located at opposite sides of recess 126 are bent downwardly and forwardly in a configuration best seen in FIG. 2. This configuration of the bracket is especially designed to form a readily applied and released, gravity maintained attachment between coupling assembly 54 and cart 20.

As best seen in FIG. 2, cart 20 has a fixed frame which includes a slightly inclined but generally vertically extending tubular post 130 having a pair of horizontal tubular frame members 132 fixedly secured to and projecting outwardly from opposite sides of post 130. To attach the coupling assembly 54 to cart 20, the coupling assembly is lowered to a suitable height and bracket 56 is then manually moved to seat post 130 in recess 126 as shown in FIGS. 2 and 3. When the post is so seated in recess 130, arms 128 overlie and extend down the forward side of frame members 132.

Referring now to FIG. 2, the post 130 engaged by the bracket 56 is, as is apparent from FIG. 1, located at a substantial distance forwardly of the center of gravity of the cart 20. If bracket 56 is lifted slightly from the position shown in FIG. 2, the edge 134 of recess 126 will tend to bite into the rearwardly inclined post 130. This will tend to press the curved portions of arms 128 downwardly and to the right as viewed in FIG. 2 against frame member 132. Because the center of gravity of the cart is located at a substantial distance to the right of bracket 56 as viewed in FIG. 2, the lifting moment applied to the cart by the elevating bracket is directly opposed by a substantial moment arm occasioned by the offset center of gravity of the cart, and this latter moment acts to more firmly press post 130 against edge 134 of the bracket recess and upwardly and to the left as viewed in FIG. 2 against the undersides of arms 128. The offset center of gravity of the cart effectively attempts to rotate post 130 in a clockwise direction as viewed in FIG. 2 about the axis of frame members 132. This geometry creates a coupling grip on the cart which is gravitationally maintained and which is easily and almost automatically released when the apparatus lowers the cart to the ground and a slight additional lowering of the coupling mechanism 54 takes place.

Referring now to FIG. 4, the suspension tape 52 carried on drum 50 receives at its lower end a horizontal cross pin 136 upon which are mounted a pair of spaced generally vertical webs 138 having openings 140 which slidably receive arm portion 116 of the coupling assembly. When bracket 56 is operatively engaged with cart 20, the geometry of cart frame members 130, 132 and bracket 56 is such that arm 116 is in parallel vertical alignment with the longitudinal centerline of the cart, and extends rearwardly of the cart from the bracket to overlie the center of gravity of cart 20. The slidable coupling between suspension tape 52 and arm 116 afforded by the pin-vertical webs 136, 138 enables the point of suspension of the coupling assembly from the lifting apparatus to be accurately positioned relative to the center of gravity of the cart.

To assure that the cart is accurately aligned with lifting head 44 when the cart is in its elevated position, a pair of downwardly opening recesses 142 (see FIGS. 1 and 4) are formed in the lower side of lifting head 44. Recesses 142 are spaced from each other and formed to receive arm 116, as best seen in FIG. 4, when the coupling assembly and attached cart 20 are in their maximum elevated position, at which position cart 20 will clear the lower side of rear door opening R during traversing movement into and out of the automobile.

To outline the operation of the lifting apparatus, reference will be had to FIG. 1.

In FIG. 1, the traversing head 30 is shown at its extreme outward limit of movement at what is termed the loading position, the lifting head 44 has been pivoted by the lever -linkage 82, 86 as described above, to what will be characterized as a lift/lower position, the coupling assembly 54 has been lowered and its bracket 56 attached to cart 20 as described above. The apparatus is now ready to load cart 20 through rear door opening R into the interior of the automobile.

To accomplish this, the operator first actuates lift motor 48 to wind up suspension tape 52, thus elevating coupling apparatus 54 and cart 20 from the ground. Elevating of the cart is continued until arm 116 is seated within notches 142 on lifting head 44.

The operator then actuates drive motor 40 to cause traversing head 30 to move from the right from the position shown in FIG. 1 to draw lifting head 44 and the suspended cart 20 toward door opening R. As this rightward movement of traversing head 30 commences, the actuating lever 82, via link 86, swings lifting head 44, in a manner described above, 90° in a counterclockwise direction about pivot 46. Because the two point engagement between the two notches 142 of lifting head 44 and arm 116 of the coupling assembly requires the coupling assembly 54 to pivot with lifting head 44, cart 20 is thus swung into a position where it moves through rear door opening R back end first. When lifting head 44 has been rotated through 90° by the action of the actuating lever 82 and link 86, latch assembly 98 is engaged to latch the lifting head 44 to arm 42, so that the suspended cart is moved into the stored position with its longitudinal centerline extending transversely of the centerline of the automobile A. When the cart has been fully conveyed into the interior of the vehicle, traversing head 30 is at its right-hand end limit of movement near the opposite side of the automobile and its drive motor 40 is deenergized. The cart is then lowered to the floor by actuation of lift motor 48.

To unload the cart 20 from the automobile, the procedure described above is simply reversed. As described above, the latch assembly 98 is automatically operated to unlatch lifting head 44 from arm 42 just prior to the time at which actuating lever 82 begins to pivot lifting head 44 back to the lift/lower relationship shown in FIG. 1.

While one embodiment of the invention has been described in detail, it will be apparent to those skilled in the art that the disclosed embodiment may be modified. Therefore, the foregoing description is to be considered exemplary rather than limiting, and the true scope of the invention is that defined in the following claims.

What is claimed is:

1. For use in combination with an automotive vehicle having a frame, a driver's seat, and a rear door opening rearwardly of and adjacent to said driver's seat affording access to a compartment in the interior of the vehicle rearwardly of the driver's seat; a loading apparatus for loading and unloading a secondary vehicle usable by a handicapped person into or out of said compartment said secondary vehicle having a length greater than the width of said rear door opening and a width less than that of said rear door opening, said apparatus comprising a traversing head mounted within said automotive vehicle for movement transversely within said vehicle from an operating position adjacent said rear door opening and a retracted position spaced substantially inwardly to said vehicle from said rear door opening, a lifting head carried by said traversing head to be located within the interior of said vehicle when said traversing head is in said retracted position and to be located outside of said rear door opening when said traversing head is in said operating position, lift means on said lifting head detachably engageable with said secondary vehicle for raising and lowering said secondary vehicle between the ground and an elevated position above the lower edge of said rear door opening with said secondary vehicle disposed in a position parallel to said automotive vehicle, alignment means engageable between said lifting head and said lift means when said secondary vehicle is positioned in said elevated position by said lifting means to locate the secondary vehicle in a predetermined alignment with said lifting head, pivot means mounting said lifting head on said traversing head for pivotal movement about a substantially vertical axis, and latch means maintaining said lifting head in a stored pivotal position with respect to said traversing head automatically releasable upon the approach of said traversing head to said operating position to permit pivoting of said lifting head about said axis to a lift/lower position wherein the secondary vehicle is disposed in parallel relationship to said automotive vehicle and pivoting of said lifting head in the opposite direction about said axis to a relatched storage position wherein the secondary vehicle supported from said lifting head is located in an endwise position relative to said automotive vehicle for passage through said door opening upon traversing movement of said traversing head.

2. The invention defined in claim 1 wherein said pivoting means comprises a lever pivotally mounted intermediate its ends on said traversing head, abutment means on said frame located to engage one end of said lever when said traversing head is at less than a predetermined distance from said operating position to pivot said lever upon said traversing head as said traversing head moves toward or away from said operating position, and transmitting means coupling the other end of said lever to said lifting head to pivot said lifting head in response to pivotal movement of said lever.

3. The invention defined in claim 1 further comprising actuator means on said traversing head, operable to release said latch means, first abutment means on said frame for operating said actuator means to release said latch means when said traversing head is within a first predetermined distance from said operating position and to latch said latch means when said traversing head is at a distance from said operating means, greater than said first distance, and second abutment means on said frame for operating said pivoting means when said traversing head is within said first predetermined distance from said operating position.

4. The invention defined in claim 3 wherein said pivoting means comprises link means pivotally interconnected between said traversing and lifting heads for pivotally positioning said lifting head relative to said traversing head in accordance with the position of said traversing head relative to said frame.

5. The invention defined in claim 1 wherein said lift means comprises a lift bracket detachably engageable with a portion of the secondary vehicle frame, a lift arm fixed to said bracket and extending generally horizontally above the longitudinal centerline of the secondary vehicle when said bracket is engaged with said portion of said secondary vehicle frame, and reversible power driven suspension means mounted on said lifting head and attached to said lifting arm at a location approximately in vertical alignment with the center of gravity of said secondary vehicle for raising and lowering said secondary vehicle when said lift bracket is engaged therewith.

6. The invention defined in claim 5 wherein said alignment means comprise means defining a pair of spaced downwardly opening notches at the lower side of said lifting head adapted to receive said lifting arm.

7. The invention defined in claim 5 wherein said power driven suspension means comprises a reversible rotary drum mounted on said lifting head, a flexible strap adapted to be wound upon or unwound from said drum upon rotation thereof, and coupling means coupling the end of said strap to said arm.

8. The invention defined in claim 7 wherein said coupling means comprises an arm receiving member slidably positionable at selected positions along said arm.

9. The invention defined in claim 5 wherein said portion of said secondary vehicle frame includes a generally vertically rearwardly inclined frame member and a pair of generally horizontal frame members projecting from opposite sides of said generally vertical member at a location forward of the center of gravity of said secondary vehicle, and said lift bracket comprises a member having a forwardly opening recess adapted to receive the rearward side of said generally vertical frame member, a pair of arms on said bracket at each side of said recess adapted, when said generally vertical frame member is seated in said recess, to pass above and downwardly along the forward sides of said generally horizontal frame members, and attachment means attaching said arm to said bracket at a location on said bracket spaced rearwardly from said recess.

10. The invention defined in claim 9 wherein said attachment means comprises a generally vertical rigid rod pivotally connected to said bracket and fixedly connected to said arm, and a rigid link member of adjustable length pivotally connected at opposite ends to said arm and to said bracket in spaced generally parallel relationship to said rod.

11. In an automotive vehicle of the four door type having a frame, and a driver's side rear door opening in said frame affording access to a compartment within said frame; the improvement comprising loading apparatus for loading and unloading a secondary vehicle having a length greater than the width of said opening into and out of said compartment via said opening, said apparatus comprising a traversing head mounted upon said frame for reciprocatory movement transversely of said automotive vehicle across the top of said compartment, reversible power means for driving said traversing head between a loading position adjacent said opening and a storage position remote from said opening, lift head means mounted on said traversing head for pivotal movement about a vertical axis, said lift head means including power driven elevating means for raising and lowering said secondary vehicle between the ground and an elevated position at which said secondary vehicle will clear the lower edge of said opening, and latch means connected between said traversing head and lift head and automatically operable to release said lift head means when the traversing head is moved from storage position to loading position for permitting pivoting of the lift head means to position the longitudinal centerline of a stored secondary vehicle approximately parallel to that of said automotive vehicle.

12. The invention defined in claim 11 wherein said positioning means comprises first means for aligning the longitudinal centerline of said secondary vehicle in a predetermined alignment with said lift means when said secondary vehicle is in said elevated position, and second means for pivoting said lift means about said vertical axis in response to movement of said traversing head relative to said frame.

13. The invention defined in claim 12 wherein said second means comprises an actuating lever pivotally mounted intermediate its ends on said traversing means, abutment means on said frame engageable with one end of said lever when said traversing head approaches said loading position to pivot said actuating lever in a first direction relative to said traversing head upon further movement of said traversing head toward said loading position, and link means for transmitting pivotal movement of said actuating lever to said lift means to swing said lift means about said vertical axis.

14. The invention defined in claim 13 wherein said link means comprises a rigid link pivotally connected at one end to the other end of said lever and pivotally connected at its opposite end to said lift means at a location offset from said vertical axis.

15. The invention defined in either of claims 13 and 14 further comprising means for releasing said latch means when said one end of said lever is engaged by said abutment means.

16. The invention defined in claim 12 wherein said lift means is located by said second means in an elevating position when said traversing means is in said loading position and is swung through 90° about said vertical axis to a traversing position by said second means as said traversing means is moved away from said loading position, said second means also being operable to swing said lift means from said traversing position to said lift position as said traversing means approaches said loading position.

17. The invention defined in claim 16 further comprising means operable during movement of said traversing means toward said loading position for releasing said latch means prior to movement of said lift means from said traversing position by operation of said second means.

18. For use in combination with an automotive vehicle having a frame, a driver's seat, and a rear door opening rearwardly of and adjacent to said driver's seat affording access to a compartment in the interior of the vehicle rearwardly of the driver's seat; a loading apparatus for loading and unloading a secondary vehicle usable by a handicapped person into or out of said compartment through said door opening comprising a traversing head mounted within said automotive vehicle for movement transversely within said vehicle from an operating position adjacent said rear door opening and a retracted position spaced substantially inwardly of said vehicle from said rear door opening, a lifting head carried by said traversing head to be located within the interior of said vehicle when said traversing head is in said retracted position and to be located outside of said rear door opening when said traversing head is in said operating position, power driven lift means on said lifting head detachably engageable with said secondary vehicle for raising and lowering said secondary vehicle between the ground and an elevated position above the lower edge of said rear door opening, and latch means responsive to movement of said traversing head to said operating position releasable for permitting swinging of said lifting head upon said traversing head to dispose the elevated secondary vehicle between a position parallel to said automotive vehicle and a position endwise of said automotive vehicle to enable said secondary vehicle to pass endwise through said door opening upon movement of said traversing head and to be positioned parallel to said automotive vehicle during raising and lowering of said secondary vehicle.

19. The invention defined in claim 18 wherein said grasping device comprises a coupling means on said elevating means for attaching said elevating means to said secondary vehicle, and means is provided defining a recess in said lift head for receiving said coupling means when said secondary vehicle has been raised to said elevated position to restrain said coupling means and said secondary vehicle against lateral and pivotal movement relative to said lift head.

20. The invention defined in claim 18 wherein said vehicle grasping device comprises coupling means provided on said elevating means and comprising a rigid vertically extending leg and a rigid horizontally extending arm fixed at one end to the upper end of said leg, bracket means mounted on the lower end of said leg for attachment to a selected portion of said secondary vehicle on the longitudinal centerline thereof in a manner such that said arm is aligned with said centerline and overlies the center of gravity of said secondary vehicle, said arm being received in said recess when said secondary vehicle has been raised to said elevated position.

21. The invention defined in claim 20 wherein said elevating means comprises a flexible suspension member for raising and lowering said coupling means, and means on said suspension member for attaching said suspension member to said arm at any of several selected positions whereby the point of attachment of said suspension means to said coupling means may be adjustably located relative to the center of gravity of said secondary vehicle when attached to said bracket means.

22. The invention defined in claim 21 wherein said selected portion of said secondary vehicle is located forwardly of the center of gravity of said vehicle and comprises a generally vertically extending fixed frame member and transverse fixed frame elements projecting from opposite sides of said fixed frame member, said bracket means having a forwardly opening recess therein forwardly of said bracket from said leg defining a seat engageable with the rearward side of said fixed frame member, and a pair of forwardly projecting arms at either side of said recess engageable with the upper and forward sides of the respective transverse frame elements when said fixed frame member is seated in said recess.

23. The invention defined in claim 18 wherein said means mounting said lifting head comprises pivot means mounting said lifting head on said traversing head for pivotal movement about a vertical axis, and positioning means responsive to the position of said traversing head relative to said frame for pivotally positioning said lifting head about said vertical axis.

24. The invention defined in claim 23 wherein said positioning means comprises link means pivotally interconnected between said lifting head and said traversing head, and abutment means on said frame engageable with said link means during movement of said traversing head to and from said operating position to cause said secondary vehicle to be swung from endwise relationship to said automotive vehicle into parallel relationship therewith as said traversing head moves to said operating position and to cause said secondary vehicle to be swung from parallel relationship to said automotive vehicle into endwise relationship therewith as said traversing head moves away from said operating position.

25. In combination with an automotive vehicle having a frame, a driver's seat, and a rear door opening rearwardly of and adjacent to said driver's seat affording access to a compartment in the interior of the vehicle rearwardly of the driver's seat; a loading apparatus having a detachable vehicle grasping device for loading and unloading a secondary vehicle usable by a handicapped person into or out of said compartment through said door opening; and means supporting said vehicle grasping device on the frame for movement to lift the secondary vehicle, to swing the elevated secondary vehicle between a position parallel to said automotive vehicle and a position endwise of said automotive vehicle to enable said secondary vehicle to pass endwise through said door opening and to move the secondary vehicle endwisely into the interior of the automotive vehicle while locating said secondary vehicle in a position parallel to said automotive vehicle during raising and lowering of said secondary vehicle at the exterior of the automotive vehicle; said means for moving the vehicle grasping device comprising a traversing head mounted upon the frame for reciprocatory movement transversely of said automotive vehicle; reversible power means for driving said traversing head between a loading position adjacent the door opening and a storage position remote from said opening; a lift head suspending the vehicle grasping device and mounted on the traversing head for movement thereon from an initial position to swing the secondary vehicle through an arc which disposes it from a position of endwise alignment with the compartment to a position of generally longitudinal alignment with the automotive vehicle; the lift head including power driven elevating means for raising and lowering the grasping device and vehicle from the ground to a position in which it will clear the lower edge of said opening; and link means carried by the traversing head and reacting between the frame and lift head, operable automatically upon the approach of said traversing head to said loading position to swing the lifting head relative to the traversing head and swing the secondary vehicle through said arc.

26. The combination defined in claim 25 in which latch means, cooperable between said frame, lift head, and traversing head is automatically operable to latch said lift head in initial position and to automatically release said lift head upon the approach of said traversing head to said loading position.

* * * * *